United States Patent
Blair et al.

(10) Patent No.: US 7,619,982 B2
(45) Date of Patent: Nov. 17, 2009

(54) ACTIVE PROBE PATH MANAGEMENT

(75) Inventors: Dana Blair, Atlanta, GA (US); Larry R. Metzger, Wake Forest, NC (US)

(73) Assignee: Cisco Technology, Inc., San Jose, CA (US)

( * ) Notice: Subject to any disclaimer, the term of this patent is extended or adjusted under 35 U.S.C. 154(b) by 585 days.

(21) Appl. No.: 11/113,629

(22) Filed: Apr. 25, 2005

(65) Prior Publication Data

US 2006/0239199 A1 Oct. 26, 2006

(51) Int. Cl.
*G01R 31/08* (2006.01)

(52) U.S. Cl. .................. 370/248; 370/249; 370/392; 370/432; 370/475; 709/201; 709/213; 709/224; 709/238; 714/4; 714/712

(58) Field of Classification Search .......... 370/248, 370/249, 392, 432, 475; 709/201, 213, 224, 709/238; 714/4, 712
See application file for complete search history.

(56) References Cited

U.S. PATENT DOCUMENTS

| | | | |
|---|---|---|---|
| 6,075,769 A | 6/2000 | Ghanwani et al. | |
| 6,292,832 B1 | 9/2001 | Shah et al. | |
| 6,324,656 B1 | 11/2001 | Gleichauf et al. | |
| 6,400,686 B1 | 6/2002 | Ghanwani et al. | |
| 6,446,121 B1 | 9/2002 | Shah et al. | |
| 6,470,073 B1 | 10/2002 | Fish et al. | |
| 6,600,724 B1 | 7/2003 | Cheng | |
| 6,717,920 B1 | 4/2004 | Cheng | |
| 6,775,280 B1 | 8/2004 | Ma et al. | |
| 6,804,712 B1 | 10/2004 | Kracht | |
| 6,868,068 B1 | 3/2005 | Jain et al. | |
| 6,868,094 B1 | 3/2005 | Bordonaro et al. | |
| 7,139,841 B1 * | 11/2006 | Somasundaram et al. | ... 709/245 |
| 7,269,157 B2 * | 9/2007 | Klinker et al. | ............... 370/351 |
| 2003/0147386 A1 | 8/2003 | Zhang et al. | |
| 2004/0024836 A1 * | 2/2004 | Keller et al. | ................. 709/213 |
| 2005/0080903 A1 * | 4/2005 | Valenci | ....................... 709/227 |

OTHER PUBLICATIONS

"NetFlow Services Solutions Guide", Oct. 2004, pp. 1-71, Cisco Systems, Inc.
U.S. Appl. No. 10/980,550, filed Nov. 3, 2004, Shah et al.

(Continued)

*Primary Examiner*—Seema S Rao
*Assistant Examiner*—Sai-Ming Chan
(74) *Attorney, Agent, or Firm*—Cesari and McKenna, LLP

(57) ABSTRACT

A technique manages paths taken by probe packets sent from a source to a target of a computer network. The novel path management technique enables each probe packet i) to be transferred onto a path of the computer network via a specific exit at the source, ii) to be returned to the source, and iii) to follow a path that closely matches the path followed by user data through the network. Specifically, one or more alternate routing tables are used by the source to select specific exits for the probe packets. Additionally, the source address of the probe packet is configured as a public address (i.e., reachable and used by actual user data traffic) to ensure that the packet is returned to the originating source and follows a path through the computer network that closely matches the path followed by user data traffic.

28 Claims, 6 Drawing Sheets

OTHER PUBLICATIONS

Postel, J., RFC 792, entitled Internet Control Message Protocol: Darpa Internet Protocol Specification, Sep. 1981, pp. 1-21.
Postel, J., RFC 862, entitled Echo Protocol, May 1983, p. 1.
Jacobson, V., and Braden, R., RFC 1072, entitled TCP Extensions For Long-Delay Paths, Oct. 1988, pp. 1-15.
Rekhter, Y., and Li, T., RFC 1771, entitled A Border Gateway Protocol 4 (BGP-4), Mar. 1995, pp. 1-54.
Perlman, Radia, Interconnections Second Edition: Bridges, Routers, Switches, and Internetworking Protocols, Addison Wesley, 1999, Sections 12.1 through 12.3, pp. 299-324.

* cited by examiner

PROBE PACKET 400

| HEADER INFORMATION 405 |
| SOURCE ADDRESS 410 |
| DESTINATION ADDRESS 415 |
| PROBE DATA (REQUEST/RETURN) 420 |

ALTERNATE ROUTING TABLE 500b

| DEST 512 | NEXT-HOP INTERFACE 514 | NEXT-HOP ADDRESS 516 |
|---|---|---|
| | ENTRY 520 | |
| P1 | LINK BR1-BR4 | NODE BR4 |
| ... | LINK BR1-BR4 | NODE BR4 |
| PN | LINK BR1-BR4 | NODE BR4 |

520a ↗ (P1 row)
520n ↗ (PN row)

FIG. 5B

ALTERNATE ROUTING TABLE 500a

| DEST 512 | NEXT-HOP INTERFACE 514 | NEXT-HOP ADDRESS 516 |
|---|---|---|
| | ENTRY 510 | |
| P1 | LINK BR1-BR3 | NODE BR3 |
| ... | LINK BR1-BR3 | NODE BR3 |
| PN | LINK BR1-BR3 | NODE BR3 |

510a ↗ (P1 row)
510n ↗ (PN row)

FIG. 5A

ACTIVE PROBE PATH MANAGEMENT

RELATED APPLICATION

This application is related to commonly owned copending U.S. patent application Ser. No. 11/113,582, entitled ACTIVE PROBE TARGET MANAGEMENT, filed by Metzger et al. on even date herewith, the contents of which are hereby incorporated in its entirety.

BACKGROUND OF THE INVENTION

1. Field of the Invention

The present invention relates to computer networks and more particularly to managing paths for probe packets transferred in a computer network.

2. Background Information

A computer network is a geographically distributed collection of nodes interconnected by communication links and segments for transporting data between end nodes, such as personal computers and workstations ("hosts"). Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS or an area is generally referred to as a "domain," and a node that interconnects different domains together is generally referred to as a "border node or border router." In general, the autonomous system may be an enterprise network, a service provider or any other network or subnetwork. Furthermore, the autonomous system may be multi-homed, i.e., comprising a plurality of different peer (neighboring) connections to one or more other routing domains or autonomous systems.

The administrative entity of an AS typically configures network nodes within the AS to route packets using predetermined intradomain routing protocols, or interior gateway protocols (IGPs), such as conventional link-state protocols and distance-vector protocols. These IGPs define the manner with which routing information and network-topology information is exchanged and processed in the AS. Examples of link-state and distance-vectors protocols known in the art are described in Sections 12.1-12.3 of the reference book entitled Interconnections, Second Edition, by Radia Perlman, published January 2000, which is hereby incorporated by reference as though fully set forth herein.

Link-state protocols, such as the Open Shortest Path First (OSPF) protocol, use cost-based routing metrics to determine how data packets are routed in an AS. As understood in the art, a relative cost value may be associated with a network node to determine the relative ease/burden of communicating with that node. For instance, the cost value may be measured in terms of the average time for a data packet to reach the node, the amount of available bandwidth over a communication link coupled to the node, etc. Network nodes in the AS generate a set of cost values associated with their neighboring nodes. Each set of cost values is then "advertised" (flooded) to the other interconnected nodes. Using the advertised cost values, each node can generate a consistent "view" of the network topology, thereby enabling the nodes to determine lowest-cost routes within the AS.

Distance-vector protocols, such as the Interior Gateway Routing Protocol (IGRP) or Routing Information Protocol (RIP), use distance-based routing metrics to determine how data packets are routed in an AS. A network node may associate a distance metric with each of its interconnected nodes in the AS. For example, the distance metric may be based on, e.g., a number of hops between a pair of nodes or an actual distance separating the nodes. Operationally, the network nodes determine distances to reachable nodes in the AS and communicate these distance metrics to their neighboring nodes. Each neighboring node augments the received set of distance metrics with its own distance measurements and forwards the augmented set of metrics to its neighbors. This process is continued until each node receives a consistent view of the network topology.

A plurality of interconnected ASes may be configured to exchange routing and reachability information among neighboring interdomain routers of the systems in accordance with a predetermined external gateway protocol, such as the Border Gateway Protocol (BGP). The BGP protocol is well known and generally described in Request for Comments (RFC) 1771, entitled *A Border Gateway Protocol 4 (BGP-4)*, published March 1995, which is hereby incorporated by reference in its entirety. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol facilitates policy-based routing in which an administrative entity places restrictions on inter-AS routing operations. For example, the administrator of a company's AS may employ a routing policy where network traffic leaving the AS is not permitted to enter a competitor's network, even if the competitor provides an otherwise acceptable routing path. To implement the BGP protocol, each AS includes at least one border node through which it communicates with other, interconnected ASes.

Because data packets enter and exit the AS through the border node, the border node is said to be located at the "edge" of the AS.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

In some networks, border nodes located at edges of ASes, e.g., between an enterprise network and one or more Internet Service Providers (ISPs), may be configured as Optimized Edge Routers (OERs). Here each OER may be configured to periodically select an Optimal Exit Link (OEL) to each ISP for a given destination prefix (a monitored prefix) based on performance, load, cost, and service level agreements (SLAs) associated with connections to the ISP. Ultimately, the end result for the enterprise network is improved Internet performance, better load distribution, and/or lower costs for Internet connections. Techniques that may be used to select the OEL for the monitored prefix include passive monitoring and/or active probing. Passive monitoring relies on gathering information from OERs learned from monitoring conventional user traffic, such as throughput, timing, latency, packet loss, reachability, etc. Active probing, on the other hand, relies on probe packets to measure various parameters associated with accessing the monitored prefix from an originating node (source). Here, the originating node may generate multiple probe packets that are then forwarded via different exits (e.g., data links) on different paths to target nodes (targets) in the monitored (destination) prefix. Upon receiving the probe packets, the targets respond to the originating node, e.g., with return packets or other known probe responses. The originating node may eventually acquire the responses and use them to measure various parameters, such as delay, loss, jitter, and reachability, etc., associated with accessing the destination prefix via the different links. The originating node may then use the parametric (performance) information (i.e., learned from passive monitoring or active probing) to select an OEL from among the different exits that may be used to reach the destination prefix.

The accuracy of active probing, however, may be influenced by several factors. In conventional networks, for instance, the RIB typically uses its routing table to select the exits for the probe packets based on the destination of the target. This limits the ability of the probe packets to measure parametric information correlated with particular exits of the source. Also, in conventional networks, returned probe response packets may not be forwarded directly to the source and instead may be forwarded to a node within the same prefix as the source that generally receives traffic for that prefix. Often, the source address used in the probe packets may not be an address that uses the same routing policy and/or path of user data. Some destination prefixes (or intermediate domains) may, in fact, drop a probe packet in transit based on the particular exit used, such as when based on certain policy decisions. In order to obtain parametric information that closely matches an expected performance with user data, the path taken by the probe packets should closely match the routing policy/path of user data.

SUMMARY OF THE INVENTION

The present invention is directed to a technique for managing paths taken by probe packets sent from a source to a target of a computer network. The novel path management technique enables each probe packet i) to be transferred onto a path of the computer network via a specific exit at the source, ii) to be returned to the source, and iii) to follow a path that closely matches the path followed by user data through the network. Specifically, one or more alternate routing tables are used by the source to select specific exits for the probe packets. Additionally, the source address of the probe packet is configured as a public address (i.e., reachable and used by actual user data traffic) to ensure that the packet is returned to the originating source and follows a path through the computer network that closely matches the path followed by user data traffic.

In accordance with one aspect of the present invention, the alternate routing tables are used to transfer probe packets via specific exits of the source, e.g., a border router, regardless of the contents of a conventional routing table of the router. For each exit of the router (e.g., physical or virtual exits), an alternate routing table is created that has routes referencing (i.e., pointing to) that particular exit (i.e., all destination addresses in the table are routed over the same exit). Each probe packet is associated with an alternate routing table, such that when performing a routing decision for the probe packet, the router uses the corresponding alternate routing table. In this way, regardless of the destination address of the target or the type of probe packet (e.g., TCP, UDP, ICMP, RTP, HTTP, etc.), the probe packet is routed over the desired exit.

In accordance with another aspect of the present invention, the source address contained in each probe packet is an address that is accessible by the public so that the probe response packet is returned to the originating source (border router). Notably, in the case where multiple border routers may receive the returned probe response packets, the source address may be part of a public address space advertised by the border routers. In this way, so long as the border routers are in communication with each other, the receiving border router forwards the probe response packet to the source border router. Additionally, the source addresses of the probe packets are chosen to be part of the public address space conventionally utilized for user data traffic to increase the probability that the probe packets follow a path through the network in a manner that closely matches the path taken by user data traffic.

Advantageously, the novel technique efficiently manages paths taken by probe packets sent from a source (e.g., border router) to a target (e.g., host) of a computer network. By incorporating the use of alternate routing tables, probe packets may be forced over any particular exit, regardless of the target destination. Also, by assigning an address to the probe packet source that is accessible to the public, probe packets may enter and exit on different external interfaces, accommodating asymmetrical routing. Further, where the source address is of the public address space used by conventional user data traffic, probe packet paths may closely follow the paths of the user data traffic in order to provide the closest matching performance results.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 5A is a schematic block diagram of an illustrative alternate routing table that may be advantageously used in accordance with the present invention;

FIG. 5B is a schematic block diagram of an illustrative alternate routing table that may be advantageously used in accordance with the present invention.

DETAILED DESCRIPTION OF AN ILLUSTRATIVE EMBODIMENT

Figure 1:
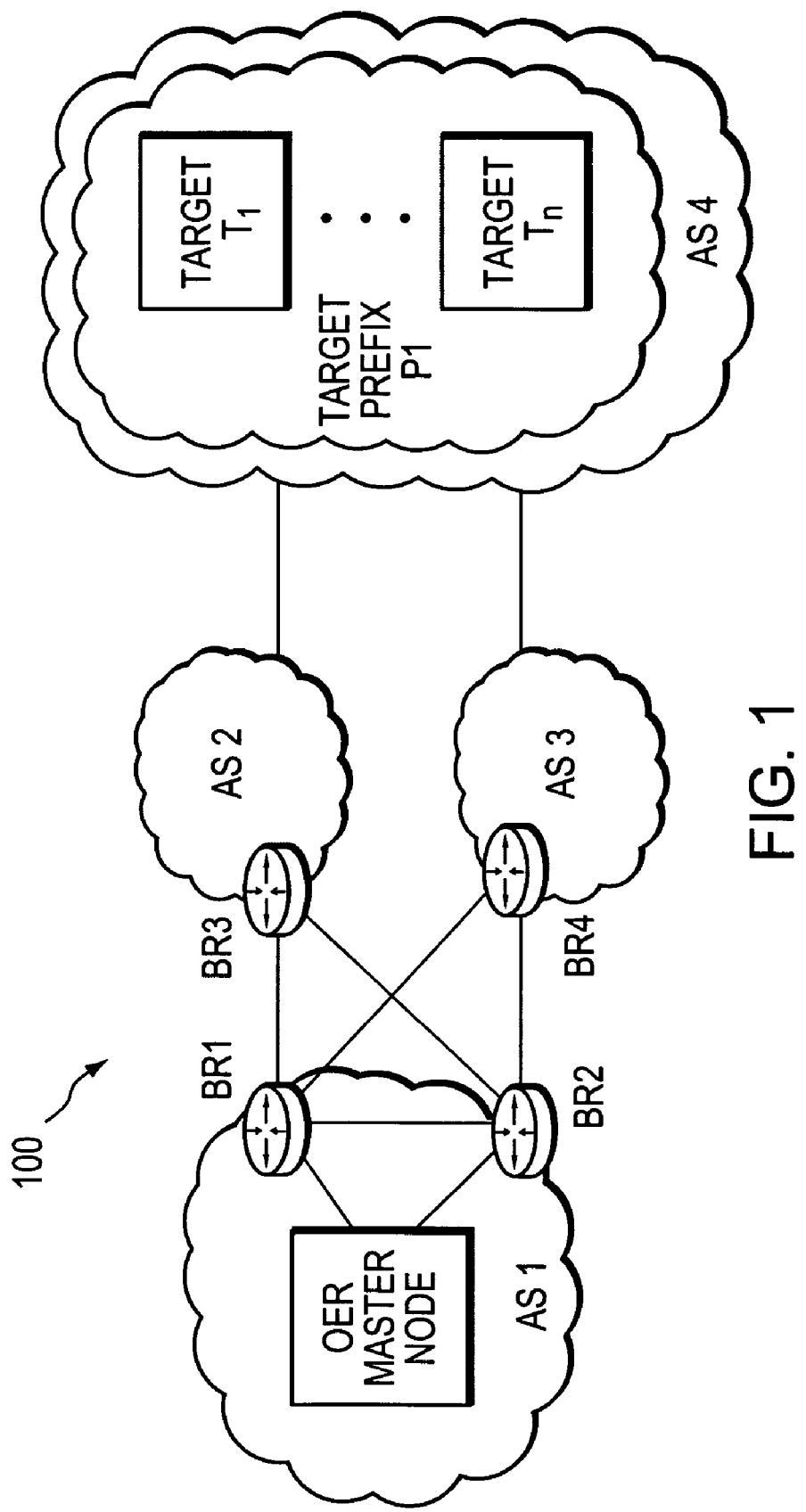
FIG. 1 is a schematic block diagram of an exemplary computer network that may be advantageously used with the present invention.

FIG. 1 is a schematic block diagram of an exemplary computer network 100 comprising a multi-homed autonomous system (AS) AS1 (e.g., an enterprise or content provider network) interconnected to AS4 (e.g., a content consumer network) via a plurality of other ASes, AS2 and AS3 (e.g., ISPs). Although each of AS1-4 is illustratively an autonomous system, those skilled in the art will appreciate that the ASes may be configured as routing domains or other networks or subnetworks. AS1 comprises one or more network nodes, including a set of communicating border nodes (illustratively, edge or border routers, BRs) BR1 and BR2, through which client communications, such as data packet traffic, can pass into and out of the AS. For example, BR1 and BR2 permit communication from AS1 to AS2 (via BR3) and AS3 (via BR4). Routing operations at the border nodes BR1-2 may be managed by an optimized edge routing (OER) "Master" node, which may be connected to the border nodes by, e.g., point-to-point links or a local area network. AS4 includes a target prefix P1, containing one or more targets or hosts T1-Tn. These examples are merely representative. Those skilled in the art will understand that any number of routers and nodes may be used in the computer network and connected in a variety of ways, and that the view shown herein is for simplicity.

Data packets may be communicated by the ASes AS1-4 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing decisions within an AS may rely on predetermined "interior" gateway protocols (IGPs), such as conventional link-state or distance-vector protocols. In addition, data packets containing network topology information may be exchanged among the ASes using "external" gateway protocols, such as the Border Gateway Protocol (BGP).

Figure 2:
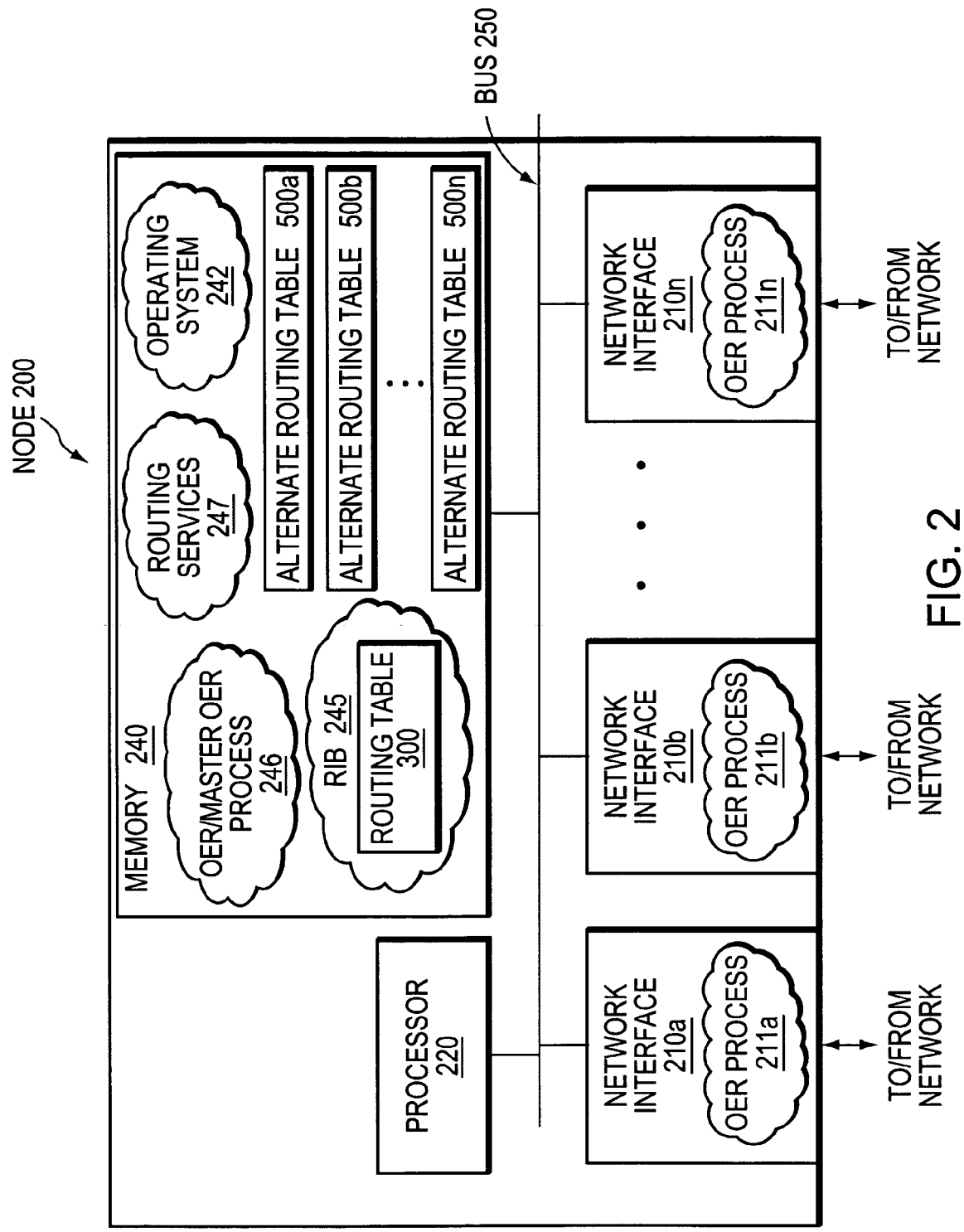
FIG. 2 is a schematic block diagram of an exemplary node that may be advantageously used with the present invention.

FIG. 2 is a schematic block diagram of an exemplary node 200 that may be advantageously used with the present invention as a border node (e.g., an edge router) or a master node. The node comprises a plurality of network interfaces 210a-n (e.g., line cards), a processor 220, and a memory 240 interconnected by a system bus 250. The network interfaces 210 contain the mechanical, electrical and signaling circuitry for communicating data over physical links coupled to the network 100, and also may be adapted to process the incoming and outgoing data, such as managing active probe packets in accordance with the present invention. The network interfaces may be further configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art. Both physical network interfaces and virtual network interfaces (e.g., routes out of an edge router) are referred to generally herein as "exits."

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as routing table 300 and alternate routing tables 500a-n. An operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services include Routing Information Base (RIB) 245, OER/Master OER Process 246, and routing services 247. It will be apparent to those skilled in the art that other processor and memory means, including various computer-readable media, may be used to store and execute program instructions pertaining to the inventive technique described herein.

Figure 3:
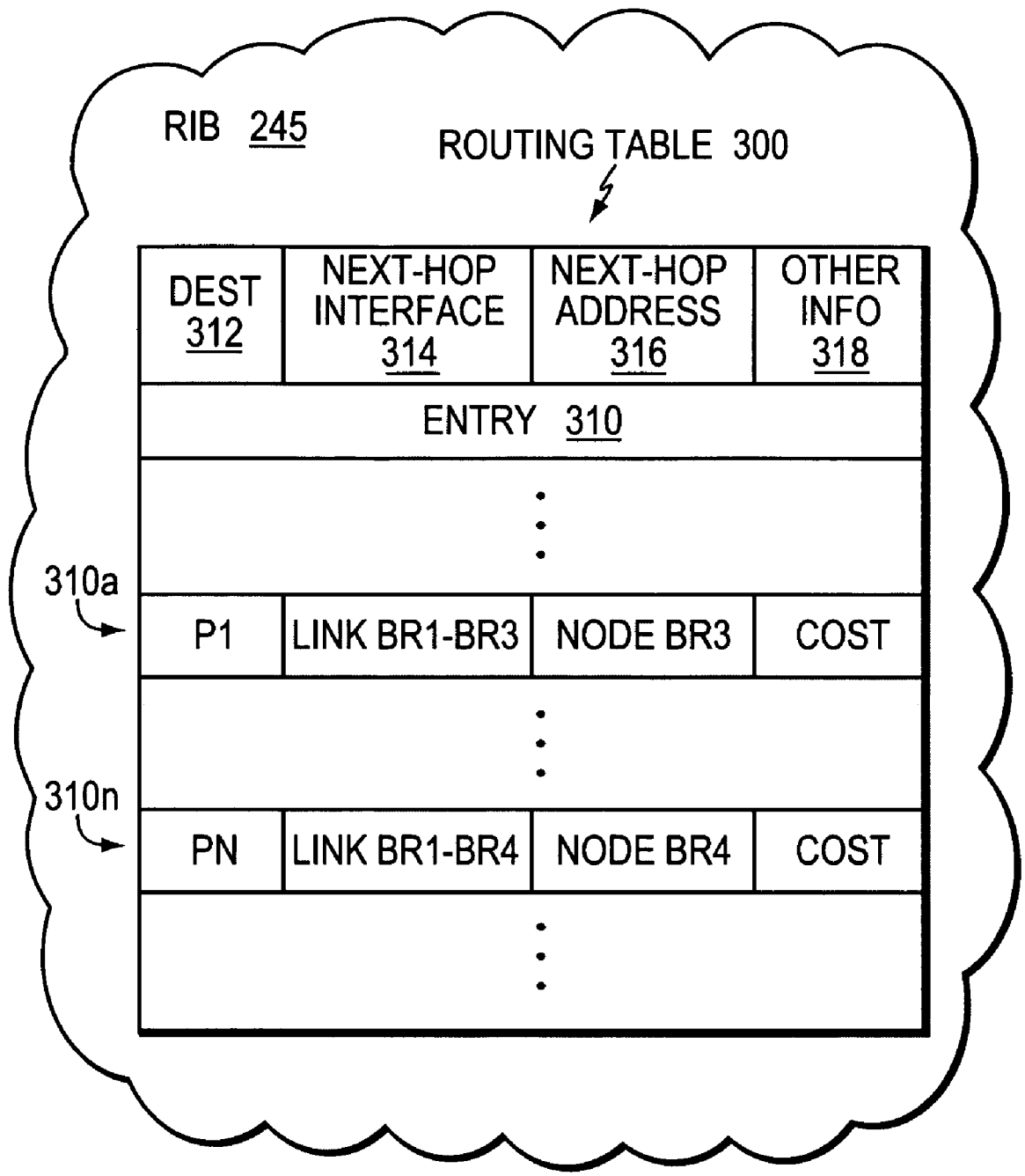
FIG. 3 is schematic block diagram of exemplary routing table that may be advantageously used with the present invention.

Routing services 247 contain computer executable instructions executed by processor 220 to perform functions provided by one or more routing protocols, such as OSPF, IS-IS, IP, BGP, etc. These functions may be configured to manage a forwarding information database (not shown) containing, e.g., data used to make forwarding decisions. The RIB 245 maintains copies of routes (paths) provided by the routing protocols, such as IGP or BGP, in order to compute best paths/routes for installation into the routing table 300. FIG. 3 is schematic block diagram of exemplary routing table 300 that may be advantageously used with the present invention. Routing table 300 is illustratively stored in memory 240 and includes one or more entries 310, each comprising a plurality of fields for storing a reachable destination address 312, a next-hop interface 314 and next-hop address 316 to reach that destination, and optionally other information 318, such as an associated metric (e.g., cost) of reaching the destination. As noted, the routing table 300 is illustratively maintained and managed by RIB 245.

For example, assume that a destination address prefix P1 is reachable from border node BR1 via border node BR3 in AS2. A destination address field 312 of entry 310a contains the reachable address P1, and the next-hop fields 314, 316, are populated with, e.g., link BR1-BR3 and a loopback address of node BR3, respectively. Note that a loopback address of the next-hop node is used as the next-hop address for many reasons, including as a way to avoid depending upon the availability of network interfaces of that node. The other information field 318 may comprise the cost of reaching P1, such as the cost of all links to the reachable address. Also, entry 310n may contain a reachable address PN (not shown), which illustratively has a different next-hop interface and address of the link from BR1 to BR4 and node BR4, respectively.

OER/Master OER Process 246 is illustratively employed by an OER node (e.g., border routers BR1-2) and an OER Master node (e.g., an OER Master router), respectively. The Master OER process 246 executing on the OER Master node communicates with border routers BR1-2 to request, among other things, the monitoring of a set of address prefixes. The OER processes 246 executing on the border routers monitor traffic at the edge of the AS1 and respond with, inter alia, network statistics corresponding to the monitored prefixes. Illustratively, instances of the OER process 246 execute on the network interfaces 210 as OER processes 211a-n configured to measure various types of network statistics acquired from monitored traffic. These statistics are then forwarded from the OER processes 211a-n to the OER process 246. The statistics may correspond to various traffic measurements, such as round-trip delay times, data throughput (i.e., the amount of data transferred or received), packet loss, reachability, etc. In general, the OER processes (notably, 246 and/or 211a-n) may measure any arbitrary traffic metric, including conventional cost-based and distance-based metrics. Further, the OER Process 246 and/or 211a-n may calculate statistical averages, variances, medians, etc. of a collection of traffic measurements.

The statistics from the OER Process 246 and/or 211a-n are then processed at the Master node in accordance with the Master OER process 246. More specifically, the Master OER process 246 analyzes the statistics and determines whether the distribution of traffic entering and/or leaving the AS1 can be optimized. If so, the Master OER process may redistribute traffic routed through the border nodes by, e.g., associating new BGP local-preference values with selected traffic or statically changing the routing table contents of the border nodes. In that sense, the Master OER process selects optimal exit links (OELs) to various destination prefixes. Notably, the Master OER process 246 may be distributed among a plurality of nodes, and thus need not reside in a single OER Master node. Also, it is not necessary for a single OER Master node to contain routing processes or routing tables, other than what is necessary for communication with the border nodes.

In order to obtain statistics in accordance with the present invention, the OER processes 246 actively probe the monitored prefix. Active probing relies on probe packets to measure various parameters associated with accessing the monitored prefix from an originating node (source). Probe packets are used by a border node to measure various parameters (e.g., jitter, delay, loss, reachability, etc.) associated with reaching the monitored prefix (e.g., a target prefix) in the network. Specifically, probe packets (requests) are generated by the border node, generally upon a request from the OER Master node, and transferred to a target node associated with the target prefix. The target node acquires each probe packet, and returns a response (reply) to the border node, such as by, e.g., modifying and returning the probe packet, returning a newly-generated response packet, or including the desired response information in a modified conventional return message (e.g., an ACK message). The border node then uses the returned probe packets to measure the various parameters associated with reaching the target prefix, and returns the results to the OER Master node.

For instance, assume that border node BR1 in AS1 measures round-trip packet delay times for traffic sent to target T1 in AS4, such as by measuring latencies of establishing a TCP session. The OER processes 246 and/or 211a-n of BR1 measure the latency between sending a TCP synchronize-sequence-number (SYN) packet to T1 and receiving a corresponding acknowledgement (ACK) packet. Alternatively, the OER processes may employ other techniques for measuring the round-trip delay times, such as issuing conventional "echo" packets (or "ping" packets). Those skilled in the art will understand that the present invention may be used with a number of protocols, such as ICMP, UDP, TCP, RTP, HTTP, etc. Notably, echo request and reply messages (echo packets) from the various protocols are described generally herein as probe packets. Moreover, it may be desirable to control the rate at which the probe packets are sent to the targets to thereby avoid refusal (filtering) by the ISP from what may appear to be a "denial of service" attack. As a result, the rate at which probe packets are sent may be limited to a very slow rate, e.g., one probe packet per minute.

Figure 4:
FIG. 4 is a schematic block diagram of an exemplary probe packet that may be used in accordance with the present invention.

FIG. 4 is a schematic block diagram of an exemplary probe packet 400 that may be used in accordance with the present invention. Probe packet 400 has a conventional header information field 405, such as an IP header. Source address field 410 contains the originating address of the probe packet, as described in detail herein. Destination address field 415 contains the address of the target to which the probe packet is destined. Illustratively, when the target responds to a probe packet (e.g., with a reply), the source address 410 and destination address 415 are switched (i.e., the source is the target, while the destination is the probe packet source.) Probe data field 420 contains the data pertinent to monitoring the parametric (performance) information, such as timestamps, probe identifiers, sequence numbers, etc. As further examples, probe packets for ICMP, UDP, and TCP are described in more detail in RFC 792, entitled *Internet Control Message Protocol*, published September 1981, RFC 862, entitled *Echo Protocol*, published May 1983, and RFC 1072, entitled *TCP Extensions for Long-Delay Paths*, published October 1988, respectively, the contents of each of which are hereby incorporated by reference in their entirety.

The border nodes send the probe packets to various targets that represent a given monitored prefix. Targets within a given prefix may either be configured targets or learned targets. A configured target may be manually configured by a system administrator or customer at the OER Master node. An example of a configured target may be where an administrator has an agreement with the target in the prefix, e.g., such as a target using UDP. Typically, there need not be a limit on the number of configured targets for a prefix. Each configured target is assumed to be usable, such as where the agreement between networks (ASes) ensures that a valid response will be returned.

A learned target, on the other hand, is a target that may be learned by monitoring traffic at the exits. For instance, a learned target can be determined by monitoring traffic that a data connection has been made from an exit to a particular node in the monitored prefix, (e.g., by detecting a TCP connect). From this information, a list can be created of nodes within the prefix, such as T1-Tn. Notably, the target need not be located beyond an adjacent domain, and could be, e.g., located in A52. Further, these nodes may be categorized into groups, such as those that have been used the most frequently, those that have the highest traffic throughput (bandwidth), or those with the highest delays. An exemplary software application that may be used to collect network statistics is NetFlow™ by Cisco Systems, Inc., which is described in more detail in the technical paper entitled *NetFlow Services Solutions Guide*, published September 2002, and is hereby incorporated by reference as though fully set forth herein. These learned nodes from the target prefix may then be used as the learned targets. Typically, although not necessarily, the most frequently used nodes or the nodes with the highest traffic throughput will be the most representative learned target node for a given prefix, such as a web server within the prefix. It may be desirable, however, to use configured targets prior to using learned targets. Techniques for learning address prefixes and collecting traffic statistics are described in commonly-owned copending U.S. patent application Ser. No. 10/980,550, entitled METHOD AND APPARATUS FOR AUTOMATICALLY OPTIMIZING ROUTING OPERATIONS AT THE EDGE OF A NETWORK, filed by Shah et al. on Nov. 3, 2004, the contents of which are hereby incorporated in its entirety. Also, a technique for managing targets is described in above-incorporated U.S. patent application Ser. No. 11/113,582, entitled ACTIVE PROBE TARGET MANAGEMENT.

The present invention is directed to a technique for managing paths taken by probe packets sent from a source to a target of a computer network. The novel path management technique enables each probe packet i) to be transferred onto a path of the computer network via a specific exit at the source, ii) to be returned to the source, and iii) to follow a path that closely matches the path followed by user data through the network. Specifically, one or more alternate routing tables are used by the source to select specific exits for the probe packets. Additionally, the source address of the probe packet is configured as a public address (i.e., reachable and used by actual user data traffic) to ensure that the packet is returned to the originating source and follows a path through the computer network that closely matches the path followed by user data traffic.

In accordance with one aspect of the present invention, the alternate routing tables are used to transfer probe packets via specific exits of the source, e.g., a border router, regardless of the contents of a conventional routing table of the router. For each exit of the router (e.g., physical or virtual exits), an alternate routing table is created that has routes referencing (i.e., pointing to) that particular exit (i.e., all destination addresses in the table are routed over the same exit). Each probe packet is associated with an alternate routing table, such that when performing a routing decision for the probe packet, the router uses the corresponding alternate routing table. In this way, regardless of the destination address of the target or the type of probe packet (e.g., TCP, UDP, ICMP, RTP, HTTP, etc.), the probe packet is routed over the desired exit.

FIG. 5A is a schematic block diagram of an illustrative alternate routing table 500*a* that may be advantageously used in accordance with the present invention. The alternate routing table 500*a* (e.g., a virtual routing table, or virtual route forwarding, VRF, table), initially created by OER process 246, essentially comprises the same format as routing table 300, but with next-hop information that forces all traffic out a particular (specified) exit. Specifically, each entry 510 of the alternate routing table may include a plurality of fields for storing a destination prefix 512, such as for a monitored (target) prefix, and a next-hop interface 514 and next-hop address 516 to reach that destination from the specified exit (e.g., a physical interface or virtual interfaces) for the alternate routing table 500*a*. Notably, to populate the next-hop fields, the border node may look not to the routing table 300 in the RIB 245, but instead to its routing protocols (e.g., in routing services 247) to find what it would use if it were to switch the route to this exit.

For example, assume that alternate routing table 500*a* is configured as the alternate routing table for the exit from BR1 to BR3. As such, any traffic bound for any prefixes P1-Pn is routed (via entries 510*a-n*) over the next-hop interface corresponding to the link between BR1 and BR3, with the next-hop address of node BR3. By setting routes for all traffic through the particular exit, any traffic that is routed using the alternate routing table 500*a*, regardless of protocol (TCP, ICMP, etc.), source address, or destination (target) address, is routed over that particular exit. Notably, entries 510*a-n* may be a single entry for all prefix values, as will be understood by those skilled in the art, or may also be separate entries for all prefix values with the same next-hop information, e.g., a default route (as shown). Moreover, it will be understood that the next-hop addresses may be different for the same next-hop interface, such as for multiple virtual interfaces (e.g., multidrop interfaces) that are associated with a single physical interface (e.g., a point-to-point interface). For instance, instead of next-hop addresses 516 of "node BR3," a virtual address may be used in selected entries 510, such as "virtual interface X," etc.

FIG. 5B is a schematic block diagram of an illustrative alternate routing table 500*b* that may be advantageously used in accordance with the present invention. The alternate routing table 500*b* has the same format as alternate routing table 500*a*, but with next-hop information that forces all traffic out a different specified exit. For example, assume that alternate routing table 500*b* is configured as the alternate routing table for the exit from BR1 to BR4. As such, any traffic bound for any prefixes P1-Pn is now routed (via entries 520*a-n*) over the next-hop interface corresponding to the link between BR1 and BR4, with the next-hop address of, e.g., node BR4 (or other virtual interface next-hop addresses, as mentioned above). Notably, each alternate routing table (e.g., 500*a-b*) is matched to an OER process of a network interface (exit), such that each exit has its own alternate routing table in the memory 240 of the border node.

Operationally, the Master OER process 246 (e.g., at an OER Master node) requests that a prefix be monitored with active probes from the border nodes. For example, the Master node requests that BR1 and BR2 generate probe packets to monitor a target prefix P1 (e.g., using targets T1-Tn) out each of their possible exits. BR1 (e.g., OER Process 246 of BR1) creates a first probe packet destined for P1, and configures the probe packet to use the alternate routing table 500*a* for a first exit from BR1 to BR3. BR1 then creates a second probe packet destined for P1 and configured to use the alternate routing table 500*b* for a second exit from BR1 to BR4. Those skilled in the art will understand that while OER Process 246 may create separate probe packets for each exit, it may also create a single probe packet for all exits. For instance, OER Process may transmit the single probe packet to a forwarding function of routing services 247 a number of times that matches the number of exits. When OER Process 246 transmits the probe packet for a particular exit to routing services 247, it instructs the routing services to use the alternate routing table associated with the particular exit to be forwarded as described above. BR1 continues this process until a probe packet is sent from all possible exits that may reach P1, and reports the results of the probe packets to the Master OER process 246 for processing. BR2 follows a similar process to BR1 in order to send probe packets to the target prefix P1. Notably, alternate routing tables 500 are used as opposed to routing table 300 because routing table 300 is configured to send traffic for a particular prefix over a single exit. By using alternate routing tables, as described above, the border nodes can force probes out any or all exits to monitor the prefix.

In accordance with another aspect of the present invention, the source address contained in each probe packet is an address that is accessible by the public so that the probe response packet is returned to the originating source (border node). Specifically, a source may select which exit it uses to forward (export) the probe packet, but the adjacent network (e.g., a group of ISPs) decides to which border node and which exit any return packets will be sent. Notably, in the case where multiple border routers may receive the returned probe response packets (e.g., asymmetric routing), the source address may be part of a public address space advertised by the border routers. In this way, so long as the border routers are in communication with each other (i.e., the receiving border node has a route to the probe packet source address), the receiving border router forwards the probe response packet to the source border router. For instance, an ISP may send all traffic to one address of the enterprise network, regardless of the particular destination address (e.g., the source address of the probe packet). This may be the case even where the ISP advertised the publicly reachable address of the probe packet source as its own. Also, the probe response packet may have been routed through an ISP (e.g., AS3) on its return path to re-enter the enterprise network AS1 that is not the original receiving ISP (e.g., AS2) adjacent to the source (e.g., BR1). To account for this, the border nodes advertise a publicly reachable address space that is used by the other border nodes to forward the received return packets to the appropriate border node.

Optionally, the source address of the probe packet may be configured as the address of the specific outgoing exit to increase the probability that the probe packet is returned to the same exit (e.g., symmetric routing). The address of the specific exit may be chosen such that the adjacent network (ISP) advertises the address as an address under its control, as understood by those skilled in the art. Notably, as mentioned above, the network may or may not use the original receiving ISP or the original outgoing exit to return the probe packet to the enterprise network. Using an address of the exit that is advertised by the adjacent ISP, however, may increase the possibility that the probe packet will utilize at least that same original receiving ISP, and not another adjacent ISP, even if the original ISP is configured to use a different exit to enter the enterprise network. There may be circumstances, however, where an asymmetric response path is desired for retrieval of various parametric information, and as such the source address may be specifically chosen as an address other than that of the specific outgoing exit.

Additionally, the source addresses of the probe packets are chosen to be part of the public address space conventionally utilized for user data traffic to increase the probability that the probe packets follow a path through the network in a manner that closely matches the path taken by user data traffic. As described above, the source address of the probe packets is chosen to be a publicly reachable address, such that the return packets may reach the originating (source) interface. Here, particularly, the public address chosen is an address that would be used by user data traffic in order to most closely represent parametric information that would be associated with sending user data over that particular exit. Notably, assuming that purely network layer routing is used, as understood to by those skilled in the art (i.e., no layer 4-7 switching) the probe response entrance will be the same as the entrance for user data associated with the publicly reachable address space.

Figure 6:
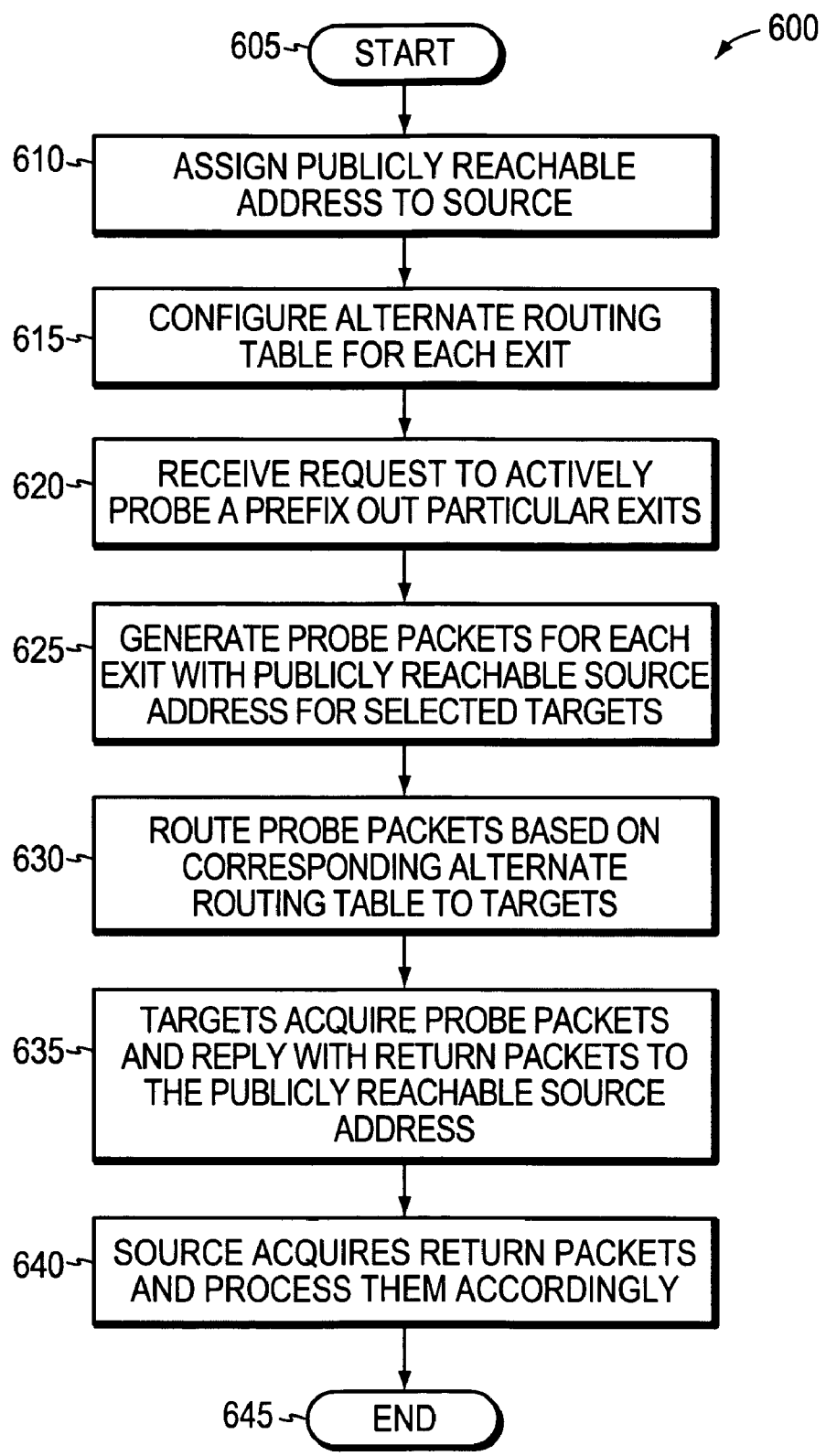
FIG. 6 is a flowchart illustrating a sequence of steps for managing paths of active probes in accordance with the present invention.

FIG. 6 is a flowchart illustrating a sequence of steps for managing paths of active probes in accordance with the present invention. The sequence 600 starts at step 605, and continues to step 610, where a publicly reachable address is assigned to each of the border nodes BR1-2. At step 615, the border nodes configure an alternate routing table 500 for each exit, with the specific route for all prefixes reachable from that particular exit, as described above. The border nodes, in step 620, receive a request from the Master node to actively probe a monitored prefix from particular exits of the border nodes (e.g., all exits). Correspondingly, the border nodes generate probe packets for each exit to the selected targets in step 625, where each packet contains the publicly reachable address of its respective border node as its source address, or other publicly reachable address for desired asymmetric response paths, as described above. Notably, each probe packet is configured to use a corresponding alternate routing table for the particular exit. In step 630, the probe packets are routed to the targets over the exits based on those corresponding alternate routing tables, and at step 635, the targets acquire and process the probe packets. Namely, the targets reply to the probe packets with return packets that are sent to the publicly reachable address contained in the source address of the probe packets. In step 640, the exits receive the return packets (corresponding to their particular probe packets), and process them accordingly, as described above with reference to OER processes, e.g., to choose the OEL for the monitored prefix. The sequence then ends in step 645.

Advantageously, the novel technique efficiently manages paths taken by probe packets sent from a source (e.g., border router) to a target (e.g., host) of a computer network. By incorporating the use of alternate routing tables, probe packets may be forced over any particular exit, regardless of the target destination. Also, by assigning an address to the probe packet source that is accessible to the public, probe packets may enter and exit on different external interfaces, accommodating asymmetrical routing. Further, where the source address is of the public address space used by conventional user data traffic, probe packet paths may closely follow the paths of the user data traffic in order to provide the closest matching performance results.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for use in a computer network for managing paths taken by one or more probe packets sent from a source to a target of a computer network, the method comprising:

assigning a publicly reachable address to the source, wherein the publicly reachable address is a part of a public address space advertised by one or more routers;

creating an alternate routing table at the source for use with the probe packets, the alternate routing table separate from a routing table used with packets other than probe packets;

transferring, to a target, the probe packets onto a path of the computer network via a specific exit at the source, based on contents of the alternate routing table; and returning, to the source, the probe packets from the target, wherein the returned probe packets are addressed to the publicly reachable address and follow a path that matches a path followed by user data through the computer network.

2. The method as in claim 1, wherein the probe packets are returned to the source via an exit at the source other than the specific exit.

3. The method as in claim 1, further comprising: configuring the alternate routing table to have a route to the target that points to the specific exit at the source.

4. The method as in claim 1, further comprising: configuring the alternate routing table to have a default route pointing to the specific exit at the source.

5. The method as in claim 1, further comprising: assigning a source address of the probe packet to increase the probability that the probe packet follows a path through the computer network that matches the path followed by user data traffic.

6. The method as in claim 1, further comprising: assigning a source address of the probe packet as the publicly reachable address to ensure that the probe packet is returned to the source.

7. The method as in claim 1, further comprising: assigning a source address of the probe packet as an address of the specific exit.

8. The method as in claim 7, wherein the address of the specific exit increases the probability that the probe packet is returned to the specific exit.

9. A source node for managing paths taken by one or more probe packets sent from the source node to a target of a computer network, the source node comprising:

a publicly reachable address assigned to the source node, wherein the publicly reachable address is a part of a public address space advertised by one or more routers;

an alternate routing table for use with the probe packets, the alternate routing table separate from a routing table used with packets other than probe packets; and one or more specific exits operable to i) transfer, to a target, the probe packets onto a path of the computer network, based on the contents of the alternate routing table; and ii) receive, from the target, the probe packets, wherein the received probe packets are addressed to the publicly reachable address and follow a path that matches a path followed by user data through the computer network.

10. A system for managing paths taken by one or more probe packets of a computer network, the system comprising:

a source operable to generate the probe packets, the source to include an alternate routing table for use with the probe packets, the alternate routing table separate from a routing table used with packets other than probe packets, the source further having a publicly reachable address, wherein the publicly reachable address is a part of a public address space advertised by one or more routers;

a target operable to reply to the probe packets sent from the source; and one or more exits at the source to i) transfer, from a specific one of the one or more exits, the probe packets onto a path of the computer network to the target, based on contents of the alternate routing table, and ii) receive, at one of the one or more exits, the probe packets from the target, wherein the received probe packets are addressed to the publicly reachable address and follow a path that matches a path followed by user data through the computer network.

11. The system as in claim 10, wherein the alternate routing table contains a route to the target that points to the specific exit at the source.

12. The system as in claim 10, wherein the alternate routing table contains a default route pointing to the specific exit at the source.

13. The system as in claim 10, further comprising: a source address of the probe packet configured to increase the probability that the probe packet follows a path through the computer network that matches the path followed by user data traffic.

14. The system as in claim 10, further comprising: a source address of the probe packet configured as the publicly reachable address to ensure that the probe packet is returned to the source.

15. The system as in claim 10, further comprising: a source address of the probe packet configured as an address of the specific exit.

16. The system as in claim 15, wherein the address of the specific exit increases the probability that the probe packet is returned to the specific exit.

17. An apparatus for managing paths taken by one or more probe packets sent from a source to a target of a computer network, the apparatus comprising:

means for assigning a publicly reachable address to the source, wherein the publicly reachable address is a part of a public address space advertised by one or more routers;

means for storing one or more routes for use with the probe packets, the means for storing separate from a routing table used with packets other than the probe packets;

means for transferring, to a target, the probe packets onto a path of the computer network via a specific exit at the source, based on contents of the means for storing; and means for returning, to the source, the probe packets from the target, wherein the returned probe packets are addressed to the publicly reachable address and follow a path that matches a path followed by user data through the computer network.

18. The apparatus as in claim 17, further comprising: means for assigning a source address of the probe packet to increase the probability that the probe packet follows a path through the computer network that matches the path followed by user data traffic.

19. A method for use at a source in a computer network, comprising:

assigning a publicly reachable address to the source, wherein the publicly reachable address is a part of a public address space advertised by one or more routers;

configuring an alternate routing table for each of a plurality of exits at the source, the alternate routing table separate from a routing table used by a Routing Information Base (RIB) to route data packets containing user data;

generating a probe packet for a specific exit to include the publicly reachable address;

transferring the probe packet from the specific exit towards the target, based on a specific alternate routing table associated with the specific exit; and receiving from the target a return packet addressed to the publicly reachable address.

20. The method as in claim 19, wherein the return packet is received at the source at an exit other than the specific exit.

21. The method as in claim 19, wherein the probe packet is utilized to obtain parametric information.

22. The method as in claim 19, wherein the target is a configured target.

23. The method as in claim 19, wherein the target is a learned target.

24. An apparatus, comprising:
 one or more alternate routing tables that are each associated with an exit of a plurality of exits at the apparatus, the one or more alternate routing tables separate from a routing table used by a Routing Information Base (RIB) to route data packets containing user data; and
 a specific exit of the plurality of exits to i) transfer a probe packet towards a target based on the contents of an alternate routing table associated with the specific exit, the probe packet to include a publicly reachable address of the apparatus that is a part of an advertised public address space, and ii) receive from the target a return packet addressed to the publicly reachable address.

25. The apparatus as in claim 24, wherein the return packet is received at an exit other than the specific exit.

26. The apparatus as in claim 24, wherein the probe packet is utilized to obtain parametric information.

27. The apparatus as in claim 24, wherein the target is a configured target.

28. The apparatus as in claim 24, wherein the target is a learned target.

* * * * *

UNITED STATES PATENT AND TRADEMARK OFFICE
CERTIFICATE OF CORRECTION

PATENT NO. : 7,619,982 B2  Page 1 of 1
APPLICATION NO. : 11/113629
DATED : November 17, 2009
INVENTOR(S) : Dana Blair It is certified that error appears in the above-identified patent and that said Letters Patent is hereby corrected as shown below:

Col. 8, Line 65, please amend as shown:

located in [[A52]]AS2. Further, these nodes may be categorized into

Col. 11, Line 67, please amend as shown:

stood [[to]] by those skilled in the art (i.e., no layer 4-7 switching)

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,619,982 B2
APPLICATION NO. : 11/113629
DATED : November 17, 2009
INVENTOR(S) : Blair et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 958 days.

Signed and Sealed this

Fourteenth Day of December, 2010

David J. Kappos
*Director of the United States Patent and Trademark Office*